United States Patent Office 3,462,363
Patented Aug. 19, 1969

3,462,363
CONTROL OF MICROORGANISMS WITH POLYHALIDE RESINS
Jack F. Mills, Midland, Mich., assignor to The Dow Chemical Company, Midland, Mich., a corporation of Delaware
No Drawing. Filed July 14, 1967, Ser. No. 653,326
Int. Cl. C02b 1/58
U.S. Cl. 210—37
7 Claims

ABSTRACT OF THE DISCLOSURE

Water is rapidly sterilized by contact with a tandem resin system containing a strong base quaternary ammonuim anion-exchange resin in polyhalide form to provide rapid in situ kill of contaminating microorganisms and a second strong base quaternary ammonium anion-exchange resin to control the residual halogen level in the treated water at a physiologically acceptable level.

BACKGROUND

Halogens have long been used to control microorganisms in water. Recently Mills et al. described in U.S. Patent 3,316,173 a process for treating water with bromine obtained by elution from an anion-exchange resin in polybromide form. The preparation of such polybromide resin system containing a strong base quaternary am- was reported earlier by Aveston and Everest in Chem. & Ind., 1238 (1957). Further research related to the Mills et al. process has revealed that extremely effective and rapid in situ microbial kill is achieved by contact of contaminated water and certain polyhalide resins.

STATEMENT OF THE INVENTION

A process has been discovered for the rapid control of microorganisms and the residual halogen content of the treated water by employing a tandem resin system. More specifically, the process comprises (A) contacting the contaminated water with a strong base quaternary ammonium anion-exchange resin in polyhalide form and containing at least 5 weight percent halogen as a polyhalide anion of the formula $(X_{2n}Y)^-$ where X and Y individually are Cl, Br or I but not both Cl, and $n$ is 1, 2 or 3; and thereafter (B) contacting the treated water with a strong base quaternary ammonium anion-exchange resin containing less than 5 weight percent halogen as said polyhalide anion to reduce the residual halogen level in the treated water to a physiologically acceptable level. Advantageously, the contaminated water is contacted with the resins in a tandem resin bed where the scavenging anion-exchange resin is initially in hydroxide form.

POLYHALIDE RESIN

Polyhalide resins suitable for use herein can be prepared by treating commercial strong base quaternary ammonium anion-exchange resin of the type described by McBurney U.S. Patent 2,591,573 and by Bauman and McKellar U.S. Patent 2,614,099 with bromine, bromine chloride, bromine iodide or iodine, preferably as a concentrated aqueous solution. The adsorbed halogen is held by the resin as a complex polyhalide anion $(X_{2n}Y^-)$. Depending primarily on the relative amount of resin and the halogen concentration, the polyhalide anion may be $Br_3^-$, $Br_5^-$, $Br_7^-$, $Br_2Cl^-$, $Br_4Cl^-$, $Br_2I^-$, $Cl_2Br^-$, $Cl_4Br^-$, $Cl_2I^-$, $I_2Cl^-$, $I_2Br^-$ etc. As noted in Schoenbeck U.S. Patent 3,101,250, the polychloride resins are unstable at ambient temperature unless maintained in an atmosphere of chlorine. Dissociation of fluorine containing polyhalides also is too high for practical use at room temperature.

The effectiveness of the polyhalide resin in treating contaminated water is related to its halogen content as well as to the specific polyhalide anion. For rapid in situ kill it is necessary to use a resin containing in polyhalide from at least about 5 weight percent and preferably about 10–50 weight percent active halogen based on the wet loaded resin.

SCAVENGER RESIN

Water in contact with a highly loaded polyhalide resin picks up a significant amount of halogen. For example, the eluent bromine concentration of water after contact with a polybromide resin containing 30–40% bromine may range from 5–10,000 p.p.m. at room temperature depending on process conditions and particularly the flow rates and contact time. Such residual halogen concentrations in the treated water are too high for most domestic purposes. Thus, further treatment to reduce the residual halogen content to a physiologically acceptable level of less than about 5 p.p.m. is normally required. Activated carbon will remove halogen from aqueous solution, but large quantities must be used because of the low efficiency.

It has now been discovered that a tandem system using a strong base quaternary ammonium anion-exchange resin as a scavenger for the excess halogen provides a marked improvement in adsorption efficiency with a reusable and easily regeneratable unit. The scavenger resin to reduce the residual halogen content to a physiologically acceptable level should contain less than about 5 weight percent of halogen in polyhalide form. Preferably, it is a virgin resin in chloride, bromide iodide or hydroxide form. A resin in hydroxide form has the further advantage of providing an effective control of the pH of the treated water by neutralizing any acid formed by hydrolysis of the eluted halogen.

The amount of scavenger resin required to reduce the residual halogen content to a physiologically acceptable or other desired level will depend on specific resin and process conditions in a manner that can be determined routinely. Usually a residual halogen content of about 0.2–1.0 p.p.m. is desirable to maintain the reduced bacterial content of the treated water. With a larger amount of scavenger resin, the dissolved halogen can be essentially completely removed. Because of the rapid in situ sterilization which occurs in contact with the polyhalide resin, a residual eluent halogen content is not required to kill microorganisms initially present in the water.

WATER TREATMENT

Since intimate contact of the water and polyhalide resin enhances the rate of in situ sterilization, the process advantageously uses resin columns and standard ion-exchange techniques. The process is particularly effective as a tandem bed operation using the polyhalide and scavenger resins in separate but successive columns or in successive parts of a single column. Thereafter, the treated water can be contacted with activated carbon to remove organic impurities, or with an acid or base to adjust the pH etc.

Effective in situ sterilization can be obtained at room temperature with flow rates of 0.1–12 bed volumes per minute using a column of standard 20–50 mesh polyhalide resin containing 10–50 weight percent halogen. However, this tandem bed process can also be used at elevated temperatures appropriate for the specific resins.

The following examples illustrate this invention further. Unless otherwise stated, all parts and percentages are by weight.

EXAMPLE 1.—TANDEM POLYHALIDE SYSTEMS (A) The requisite polyhalide resins were prepared by addition of the appropriate halogen ($Br_2$, $Cl_2$, $I_2$) or interhalogen (IBr, ICl, BrCl) to a strong base quaternary ammonium anion-exchange resin in halide ($Cl^-$, $Br^-$ or $I^-$) or hydroxide form. The resin normally was Dowex 1 or 21 K resin from The Dow Chemical Company, but other other strong base anion-exchange resins have similar properties. Weak base anion-exchange resins are generally unsuitable. To ensure uniform loading of the polyhalide resin, the halogen is preferably added to stirred aqueous slurry of the resin. The resulting halogen content of the wet loaded resin can be determined by reducing the sorbed halogen, determining the total inorganic halide and then correcting for the initial halide counteranion. The loaded polyhalide resins normally contain about 25–35% active halogen.

Standard test columns were prepared by placing 5–15 ml. of a strong base quaternary ammonium anion-exchange resin in $OH^-$ form in a column on a porous plate or plug covered with 2 ml. of coarse charcoal or other inert support. Finally, about 5 ml. of polyhalide resin was added.

(B) To determine the germicidal efficiency of a tandem polyhalide system, known amounts of *E. coli*, Staphylococcus or *S. aureus* in water, generally 1 ml. containing about 125,000 organisms/ml., was added to a test column and then the column was rapidly eluted with about 1–15 bed volumes (b.v.) of sterile water per minute for 45 min. Samples of the column effluent were taken periodically and analyzed for residual halogen, pH and bacteria. Residual halogen was rarely found, but the samples for microbiological tests were rapidly treated with dilute thiosulfate to remove any trace of halogen prior to plating on nutrient agar.

Typical results with several tandem polyhalide systems are given in Tables 1–4.

TABLE 1.—TANDEM POLYBROMIDE SYSTEM
[Dowex 21 K, $Br^-_3$; 28% $Br_2$; 25° C.]

| Test | Resin volume (ml.) Polyhalide | Resin volume (ml.) Scavenger | Elution, b.v./min. | Microorganisms 1.25×10⁵/ml. | Percent kill |
|---|---|---|---|---|---|
| 1-1 | [1] None | | 10 | 1.9 | *E. coli* | [2] Low |
| 1-2 | [1] None | | 15 | 1.9 | Staph | [2] Low |
| 1-3 | 5 | 5 | 1.9 | *E. coli* | 99.99 |
| 1-4 | 5 | 5 | 2.3 | Staph | 99.99 |
| 1-5 | 5 | 15 | 12.8 | *S. aureus* | 99.99 |

[1] 5 ml. $Br^-$ form as control.
[2] Too numerous to count.

TABLE 2.—TANDEM POLYBROMOCHLORATE SYSTEM
[Dowex 21 K, $Br_2Cl^-$; 27.5% $Br_2$; 25° C.]

| Test | Resin volume (ml.) Polyhalide | Resin volume (ml.) Scavenger | Elution, b.v./min. | Microorganisms 1.25×10⁵/ml. | Percent kill |
|---|---|---|---|---|---|
| 2-1 | [1] None | | 10 | 1.9 | *E. coli* | [2] Low |
| 2-2 | 5 | 5 | 2.0 | *S. aureus* | 100 |
| 2-3 | 5 | 10 | 2.0 | *S. aureus* | 100 |
| 2-4 | 5 | 10 | 6.0 | *S. aureus* | 100 |
| 2-5 | 5 | 15 | 12.4 | *S. aureus* | 99.99 |

[1] Control.  [2] Too numerous to count.

TABLE 3.—TANDEM POLYBROMOIODATE SYSTEM
[Dowex 21 K, $IBr^-_2$; 33% IBr; 25°C.]

| Test | Resin volume (ml.) Polyhalide | Resin volume (ml.) Scavenger | Elution, b.v./min. | Microorganisms 1.25×10⁵/ml. | Percent kill |
|---|---|---|---|---|---|
| 3-1 | [1] None | | 10 | 1.9 | *E. coli* | [2] Low |
| 3-2 | 5 | 5 | 1.8 | *S. aureus* | 100 |
| 3-3 | 5 | 10 | 2.0 | *E. coli* | 99.99 |
| 3-4 | 5 | 10 | 6.0 | *S. aureus* | 99.99 |
| 3-5 | 5 | 15 | 12.8 | *S. aureus* | 99.99 |

[1] Control.  [2] Too numerous to count.

TABLE 4.—TANDEM POLYIODOCHLORATE SYSTEM
[(A) Dowex 21 K, $I_2Cl^-$; 36.5% $I_2$; (B) Dowex 21 K, $ICl^-_2$; 28% ICl]

| Test | Resin volume (ml.) Polyhalide | Resin volume (ml.) Scavenger | Elution, b.v./min. | Microorganisms 1.25×10⁵/ml. | Percent kill |
|---|---|---|---|---|---|
| 4-1 | [1] None | | 10 | 1.9 | *E. coli* | [2] Low |
| 4-2 | 5(A) | 5 | 2.0 | *S. aureus* | 100 |
| 4-3[3] | 5(A) | 10 | 2.1 | *S. aureus* | 100 |
| 4-4[3] | 5(A) | 10 | 2.0 | *E. coli* | 99.999 |
| 4-5 | 5(B) | 5 | 1.8 | *S. aureus* | 100 |
| 4-6 | 5(B) | 5 | 2.0 | *E. coli* | 100 |
| 4-7 | 5(B) | 10 | 2.0 | *E. coli* | 100 |
| 4-8 | 5(B) | 10 | 6.0 | *S. aureus* | 100 |
| 4-9 | 5(B) | 15 | 12.2 | *S. aureus* | 100 |

[1] Control.
[2] Too numerous to count.
[3] 50° C.

In general the most effective polyhalide anions were $Br_3^-$, $IBr_2^-$ and $Br_2Cl$. The equilibrium dissociation of the iodides, particularly $I_3^-$, was low.

EXAMPLE 2.—IN SITU KILL WITH POLYBROMIDE RESIN (A) To examine the residence time required for effective in situ microorganism kill with a polybromide resin containing 5% $Br_2$, a 100 ml. column was charged with 50 ml. of polybromide resin. Sterile water at 1.14 b.v./min. was passed through the column for 10 min. and the eluent bromine concentration determined (0.72 p.p.m.). Then 1.0 ml. of *E. coli* culture standardized at 10⁸ microorganisms/ml. was injected into the top of the column and elution resumed. Effluent samples were taken periodically in sterile bottles containing dilute thiosulfate. After 15 minutes the eluent bromine concentration was redetermined (1.08 p.p.m.). The samples were then plated on nutrient agar at 37° C., 70% RH for 24 hrs. and read. There was no visible microorganism growth.

(B) In a duplicate experiment using 50 ml. of resin in $Br^-$ form (no active $Br_2$), the injected bacteria were detected in the eluent 30 seconds after injection and were essentially completely eluted in 3 min.

(C) In subsequent experiments, a single eluent cut was collected in sterile 2% thiosulfate solution for a sufficient time to collect nearly all the surviving bacteria. Then 1 ml. samples were plated on Endo's agar. Data in Table 5 show the rapid in situ kill.

TABLE 5.—POLYBROMIDE RESIN, 5% $Br_2$

| Run | Eluent $Br_2$ (p.p.m.) Init. | Eluent $Br_2$ (p.p.m.) Final | Residence Time, sec. | pH | Apparent percent red. in bacteria |
|---|---|---|---|---|---|
| 5-1 | 1.53 | 0.72 | 40 | | 99.9994 |
| 5-2 | 0.72 | 0.95 | 77 | 6.2 | 99.9997 |
| 5-3 | 2.3 | 1.9 | 28 | 6.0 | 100 |
| 5-4 | 1.58 | 2.16 | 14 | 6.4 | 99.9999 |
| 5-5 | 5.40 | 7.06 | 13 | 6.2 | 99.9998 |

Note that the eluent $Br_2$ concentration is higher than the 0.5–1.0 p.p.m. generally considered physiologically acceptable. This residual bromine content is rapidly scavenged by passing through another column of strong base resin in halide or hydroxide form.

EXAMPLE 3.—DISSOCIATION OF HALOGEN FROM POLYHALIDE RESIN

A series of experiments were carried out to determine the rate of hydrolysis and dissociation of polyhalide resins on contact with water. With a polybromochlorate resin ($Br_2Cl^-$) loss of bromine was visually evident when water was passed through a column of polyhalide resin. However, by addition of a subsequent bed of virgin strong base resin in $Cl^-$ form, the eluted bromine was visibly picked up by the virgin resin.

TABLE 6.—DISSOCIATION OF POLYHALIDE RESINS DOW, EX 21K RESIN; 25° C.

| Resin | Polyhalide | Percent halogen ($X_2$) | $X_2$ conc. in $H_2O$, 25° C (p.p.m.) |
|---|---|---|---|
| 6-1 | $Br_3^-$ | 30% $Br_2$ | 205 |
| 6-2 | $Br_2Cl$ | 27.5% $Br_2$ | 173 |
| 6-3 | $IBr_2^-$ | 33.2% $IBr$ | 35 |
| 6-4 | $IBrCl$ | 33.2% $IBr$ | 75 |

I claim:

1. A process for the control of microorganisms in water which comprises:

(A) contacting the water to be treated with a strong base quaternary ammonium anion-exchange resin in polyhalide form and containing at least 5 weight percent halogen as a polyhalide anion of the formula $(X_{2n}Y)^-$ where X and Y individually are Cl, Br, or I but not both Cl, and $n$ is 1, 2 or 3; the flow rate of the water and the contact time with said resin being selected to substantially completely kill the microorganisms and to leave a residual halogen concentration exceeding about 5 p.p.m.; and thereafter (B) contacting the thusly treated water with a strong base quaternary ammonium anion-exchange resin containing less than 5 weight percent halogen as a polyhalide anion to reduce the residual halogen level in the treated water, the flow rate of the treated water and the contact time being selected to reduce the residual halogen concentration to a physiologically acceptable level of no more than about 1.0 p.p.m.

2. The process of claim 1 where the polyhalide anion is a polybromide.

3. The process of claim 1 where the polyhalide anion is a polybromochlorate.

4. The process of claim 1 where the polyhalide anion is a polybromoiodate.

5. The process of claim 1 where the polyhalide anion is a polyiodochlorate.

6. The process of claim 1 where the scavenger resin is in hydroxide form.

7. The process of claim 1 where the water is treated in a tandem bed column.

References Cited

UNITED STATES PATENTS 3,316,173    4/1967    Mills   ---------------- 210—62

SAMIH N. ZAHARNA, Primary Examiner

U.S. Cl. X.R.

210—62; 424—79

PO-1050
(5/69)

UNITED STATES PATENT OFFICE
CERTIFICATE OF CORRECTION

Patent No. 3,462,363                Dated September 26, 1969

Inventor(s) Jack F. Mills

It is certified that error appears in the above-identified patent and that said Letters Patent are hereby corrected as shown below:

Col. 1, line 29, delete "system containing a strong base quaternary am-" and insert --by adsorption of bromine from aqueous solution--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents